(12) United States Patent
Vana et al.

(10) Patent No.: US 11,869,375 B2
(45) Date of Patent: Jan. 9, 2024

(54) INTELLIGENT AIRPORT RAMP AND ELECTRIC TAXI-DRIVEN AIRCRAFT GROUND MOVEMENT MONITORING SYSTEM

(71) Applicant: Borealis Technical Limited, North Plains, OR (US)

(72) Inventors: Jan Vana, Prague (CZ); Isaiah W. Cox, London (GB); Joseph J. Cox, Portland, OR (US)

(73) Assignee: Borealis Technical Limited, Isle of Man (IM)

( * ) Notice: Subject to any disclaimer, the term of this patent is extended or adjusted under 35 U.S.C. 154(b) by 321 days.

(21) Appl. No.: 16/502,503

(22) Filed: Jul. 3, 2019

(65) Prior Publication Data

US 2020/0013301 A1  Jan. 9, 2020

Related U.S. Application Data

(60) Provisional application No. 62/693,830, filed on Jul. 3, 2018.

(51) Int. Cl.
*G08G 5/04* (2006.01)
*G08G 5/00* (2006.01)
(Continued)

(52) U.S. Cl.
CPC .......... *G08G 5/045* (2013.01); *B64C 25/405* (2013.01); *G05D 1/0055* (2013.01);
(Continued)

(58) Field of Classification Search
CPC .. G05D 1/0088; G05D 1/0212; G05D 1/0061; G05D 1/0246; G05D 1/0044;
(Continued)

(56) References Cited

U.S. PATENT DOCUMENTS 4,994,681 A    2/1991 Mann
6,389,334 B1   5/2002 Castor
(Continued)

FOREIGN PATENT DOCUMENTS

EP   0980828 A1      8/1999
EP   3064407 A1 *   9/2016   ............. G08G 5/065
EP   3222529 A1      9/2017

OTHER PUBLICATIONS

UK Intellectual Property Office: Combined Search Report Under Section 17 and Examination Report Under Section 18(3); dated Dec. 18, 2019.

(Continued)

*Primary Examiner* — Ig T An

(57) ABSTRACT

A monitoring system and method are provided to monitor ground movement of aircraft driven with electric taxi drive systems and movement of ground service vehicles and equipment and personnel within airport ramp areas. Monitor and sensor devices, including those that are intelligent and employ scanning technology to generate image, positional, and other data may be mounted in locations on aircraft, ground service vehicles and equipment, passenger loading bridges, an airport terminal, and other ramp locations to generate a constant stream of data as the aircraft moves into, within, and out of an airport ramp area. The data stream is transmitted to an artificial intelligence-based processing system to identify and communicate possible safety hazards to multiple locations so that the aircraft's ground travel or a ground vehicle's travel may be altered to avoid identified safety hazards and to avoid collisions.

15 Claims, 2 Drawing Sheets

(51) Int. Cl.
*G08G 5/06* (2006.01)
*B64C 25/40* (2006.01)
*G08G 5/02* (2006.01)
*G05D 1/00* (2006.01)
*B64C 25/32* (2006.01)

(52) U.S. Cl.
CPC ......... *G08G 5/0013* (2013.01); *G08G 5/0043* (2013.01); *G08G 5/025* (2013.01); *G08G 5/065* (2013.01)

(58) Field of Classification Search
CPC ...... G08G 1/16; G08G 5/0008; G08G 5/0078; G08G 5/045
See application file for complete search history.

(56) References Cited

U.S. PATENT DOCUMENTS

| | | | |
|---|---|---|---|
| 6,665,063 B2 | 12/2003 | Jamieson | |
| 9,091,762 B2 | 7/2015 | Knight | |
| 9,394,059 B2 | 7/2016 | Cox | |
| 9,958,867 B2 | 5/2018 | Cox | |
| 11,151,855 B1* | 10/2021 | Hough | G06V 20/52 |
| 2010/0052973 A1 | 3/2010 | Fabre et al. | |
| 2015/0051757 A1* | 2/2015 | Cox | B64C 25/405 |
| | | | 701/3 |
| 2015/0142214 A1* | 5/2015 | Cox | G05D 1/0083 |
| | | | 701/3 |
| 2016/0167803 A1 | 6/2016 | Cookman et al. | |
| 2016/0351061 A1* | 12/2016 | Lamkin | G08G 5/0021 |
| 2017/0148333 A1 | 5/2017 | Alonso Tabares | |
| 2018/0196435 A1* | 7/2018 | Kunzi | G05D 1/0088 |

OTHER PUBLICATIONS

Ross Marowitz, Artificial Intelligence promises bright future for airlines and passengers, Apr. 29, 2018 https://www.ctvnews.ca/sci-tech/artificial-intelligence-promises-bright-future-for-airlines-and-passengers-1.3907375.

Wikipedia, Computer Vision, See especially System Methods and Hardware sections https://en.wikipedia.org/wiki/Computer_vision.

* cited by examiner

INTELLIGENT AIRPORT RAMP AND ELECTRIC TAXI-DRIVEN AIRCRAFT GROUND MOVEMENT MONITORING SYSTEM

PRIORITY CLAIM

This application claims priority from U.S. Provisional Patent Application No. 62/693,830, filed 3 Jul. 2018, the entire disclosure of which is fully incorporated herein in its entirety.

FIELD OF THE INVENTION

The present invention relates generally to systems and methods for monitoring airport ramp areas and moving aircraft to increase aircraft ground travel and ramp safety and specifically to an intelligent airport and electric taxi-driven aircraft ground movement monitoring system useful for enhancing safety and avoiding collisions and ground incidents in airport apron or ramp areas.

BACKGROUND OF THE INVENTION

Apron or ramp areas can be very congested places at today's airport terminals. Multiple aircraft are simultaneously arriving and departing, ground-based service vehicles and personnel are servicing parked aircraft, and ground crews are directing the arriving and departing aircraft into and out of gates. In addition, the entrances and exits between taxiways and these congested ramp areas may themselves become congested as multiple aircraft move into and out of ramp areas to park and transfer passengers and cargo. The avoidance of collisions and similar adverse ground incidents in these areas requires careful monitoring and control of the locations and movements of aircraft and other vehicles as they are maneuvered within the ramps and at gates, as well as the locations of ramp personnel and equipment during the maneuvering. Whether the aircraft are maneuvering into a parking location or being pushed back at departure, ground crews currently guide the moving aircraft, largely because the pilot and flight crew are not able to see the entire ground environment surrounding the aircraft. The sides and rear of the aircraft exterior, from the ground surface to above the wings, are not visible to the pilot and flight crew from the cockpit. The use of cameras and sensors mounted on exterior locations on aircraft has been helpful. However, despite the availability of these devices, incidents involving collisions during ground maneuvers within an airport ramp area, for example between moving and parked aircraft and moving aircraft and ground service equipment, still occur all too frequently.

The efficiency, speed, and safety of aircraft ramp ground operations, whether during taxi into an airport terminal parking location or during pushback out of the parking location, may be adversely affected by the ground congestion found in the ramp areas at most large airports. Multiple airlines concurrently conduct both pushback and arrival operations for multiple aircraft, and aircraft often must park in parking locations with minimal safe clearance. This strains both the available ground personnel and the available equipment. Aircraft turnaround times may be increased significantly when ground personnel and tow bars, adapters, tugs or other equipment are not available when needed. Turnaround delays have become all too common.

Driving an aircraft on the ground independently during taxi with pilot-controlled landing gear wheel-mounted electric taxi or other drive systems without reliance on operation of the aircraft's main engines or the use of tow vehicles has been proposed by Applicant and others. As the pilot controls operation of the electric taxi drive system to maneuver an aircraft independently of engines and tugs during ground travel between a ramp area and a taxiway and within the ramp area, pilot situational awareness may be increased compared to when aircraft are driven with operating engines, which may improve ground operation safety. Additional monitoring of the ground level environment external to the portions of the aircraft not readily visible to the pilot or crew driving the aircraft and analysis of the data obtained, however, would improve pilot situational awareness, avoid potential collisions, and enhance safe operation of the aircraft as they are driven independently with electric taxi drive systems into and out of congested airport ramp areas. Facilitating monitoring of the ramp environment by ground personnel may also avoid potential collisions and enhance safe ramp operations.

Applicant has proposed a monitoring method useful during accelerated pushback for aircraft driven with engines-off taxi systems that includes a plurality of different types of sensing devices mounted on the exterior of the aircraft in U.S. Pat. No. 9,394,059. Scanning an aircraft's landing zone area to target obstacles while an aircraft is still in the air has also been proposed, for example in U.S. Pat. No. 6,665,063.

Some airport ramp area monitoring devices and systems are also available, including the Safedock docking system mounted on terminal gates that employs LiDAR technology to automatically guide pilots into gate parking locations. Closed circuit television (CCTV) cameras may be supplied at gate locations in airport apron and ramp areas at many airports. Such CCTV cameras may monitor gate security, among other uses. Employing these cameras in combination with a computer-based data collection and analysis system and associated software has been proposed to keep track of specific services rendered in gate areas in connection with an aircraft's turnaround. For example, a proposed system monitors ramp areas as seen from the positions of the cameras on the gates and/or terminal buildings and may provide a record of various activities during aircraft turnaround; however, the extent of the ramp area monitored may be limited by the fixed gate and terminal locations of these cameras.

Artificial intelligence (AI), very generally defined as machine intelligence, has received much attention lately, and its potential applications are currently the focus of significant research and discussion. A range of automated applications, including driverless cars, assisted medical diagnosis, and personal assistants, exemplify a few of the present suggested or actual uses of artificial intelligence. Airline and airport operations, of necessity, must focus on establishing and maintaining safety and have relied on human control and intervention to achieve an increasingly safer level of air travel. While airlines and airports have employed artificial intelligence to improve some aspects of passenger experience, such as answering common passenger questions with chatbots and verifying boarding and luggage with facial recognition, it has been thought difficult to continue to maintain safety, especially in the ramp area, while relinquishing human control and intervention in other operations.

That artificial intelligence might be useful in the airline industry has been recognized, and the airline industry's investment in artificial intelligence is expected to increase from about US $152 million in 2018 to an estimated about US $2.22 billion in 2025, with no suggestion of specific airline, aircraft, or airport operations or functions that could be coupled to artificial intelligence. It is estimated that global passenger traffic is likely to double over the next two decades, which will strain existing air traffic control and other airport, and airline, aircraft and passenger handling systems. The constant monitoring of aircraft movements into, within, and out of ramp areas, coupled with the analysis and automatic control possible with artificial intelligence, could improve the safety and efficiency of airport ramp operations and facilitate handling of the expected increase in passenger traffic by airports and airlines. A need exists for a system capable of achieving these objectives.

SUMMARY OF THE INVENTION

It is a primary object of the present invention, therefore, to provide a monitoring system that is capable of constantly monitoring aircraft and other movements into, within, and out of ramp areas that may employ artificial intelligence-based processing to produce a constant stream of real time data for automatic analysis and implementation to improve the safety and efficiency of airport ramp operations.

It is another object of the present invention to provide a monitoring system for aircraft driven by electric taxi drive systems during ground travel in an airport ramp area with monitoring devices positioned to provide a constant stream of data of views of the aircraft exterior and adjacent ground environment to a processing system that may employ artificial intelligence to automatically control the electric taxi drive system-powered aircraft ground movement and direction to avoid collisions or other ground incidents as indicated by the streamed data.

It is yet an additional object of the present invention to provide an improved airport ramp area safety hazard identification and warning system that employs a combination of monitors, sensors, cameras, and scanning devices to constantly provide position and other data for moving and non-moving aircraft, ground service equipment and vehicles, and persons within a ramp area to be monitored from multiple points of view to an artificial intelligence-based processing system to identify safety hazards and to provide warnings to all responsible for ramp safety so that action can be taken to avoid the identified safety hazards.

It is yet a further object of the present invention to provide a method for improving airport ramp safety and efficiency of ground movement when aircraft driven by electric taxi drive systems, ramp vehicles, and ramp equipment are equipped with a monitoring system that may employ multiple numbers and kinds of monitoring devices and artificial intelligence-based processing technology to guide aircraft, vehicle, and equipment ramp maneuvers to avoid safety hazards and collisions with other aircraft, vehicles, equipment, or personnel as the electric taxi system-driven aircraft move within airport ramp areas.

It is yet a further object of the present invention to provide an artificial intelligence-based monitoring method that monitors and maximizes safety of gate and ground operations within an airport ramp area to identify problems and facilitate solutions of identified problems in real time.

In accordance with the aforesaid objects, a monitoring system is provided that may employ artificial intelligence-based processing to monitor airport ramp areas and the ground movement of aircraft driven by electric taxi drive systems within airport ramp areas. Single ones or combinations of multiple monitoring devices that employ scanning technology and generate image, positional, and other data may be optimally mounted on the electric taxi system driven aircraft to generate images and other data from points of view within and outside the aircraft as the aircraft is driven with the electric taxi drive system into, within, and out of an airport ramp area. The data may be constantly transmitted to an artificial intelligence-based processing system that identifies possible safety hazards and may provide warnings, so that the aircraft's ground travel may be altered to avoid the identified safety hazards and potential collisions as the aircraft is driven with the electric taxi drive system. Similar monitoring devices may be mounted on ground service equipment and vehicles and on aircraft not driven by electric taxi drive systems, as well as on gates, passenger loading bridges, and terminal building structures within or adjacent to the ramp area. Hazard data information may be provided by the system to all parties that may be involved in a potential incident, including aircraft pilots, drivers of ground service vehicles and equipment, and those with primary responsibility for overall ramp safety. Warnings may also be provided to these personnel to enable manual control of aircraft and ground vehicle ground movement or the system may automatically control movement. A method for providing constant monitoring of electric taxi-driven aircraft and other moving and non-moving aircraft, ground service vehicles, and equipment within an aircraft ramp area with the present monitoring system is also provided.

The present monitoring system will be able to detect, analyze, and process data from monitoring devices mounted on electric taxi-driven aircraft and from other sources to identify and provide warnings to aircraft pilots and others about potential ramp safety hazards and to detect abnormal activities within the ramp, such as a vehicle moving at an abnormal speed and a ground service vehicle approaching an aircraft from the wrong side. Achieving the level of ramp safety provided by the present monitoring system may produce efficiencies in ramp and ground operations and turnaround times with a smaller number of ground personnel than is currently possible.

Other objects and advantages will be apparent from the following description, claims, and drawings.

DESCRIPTION OF THE INVENTION

Figure 1:
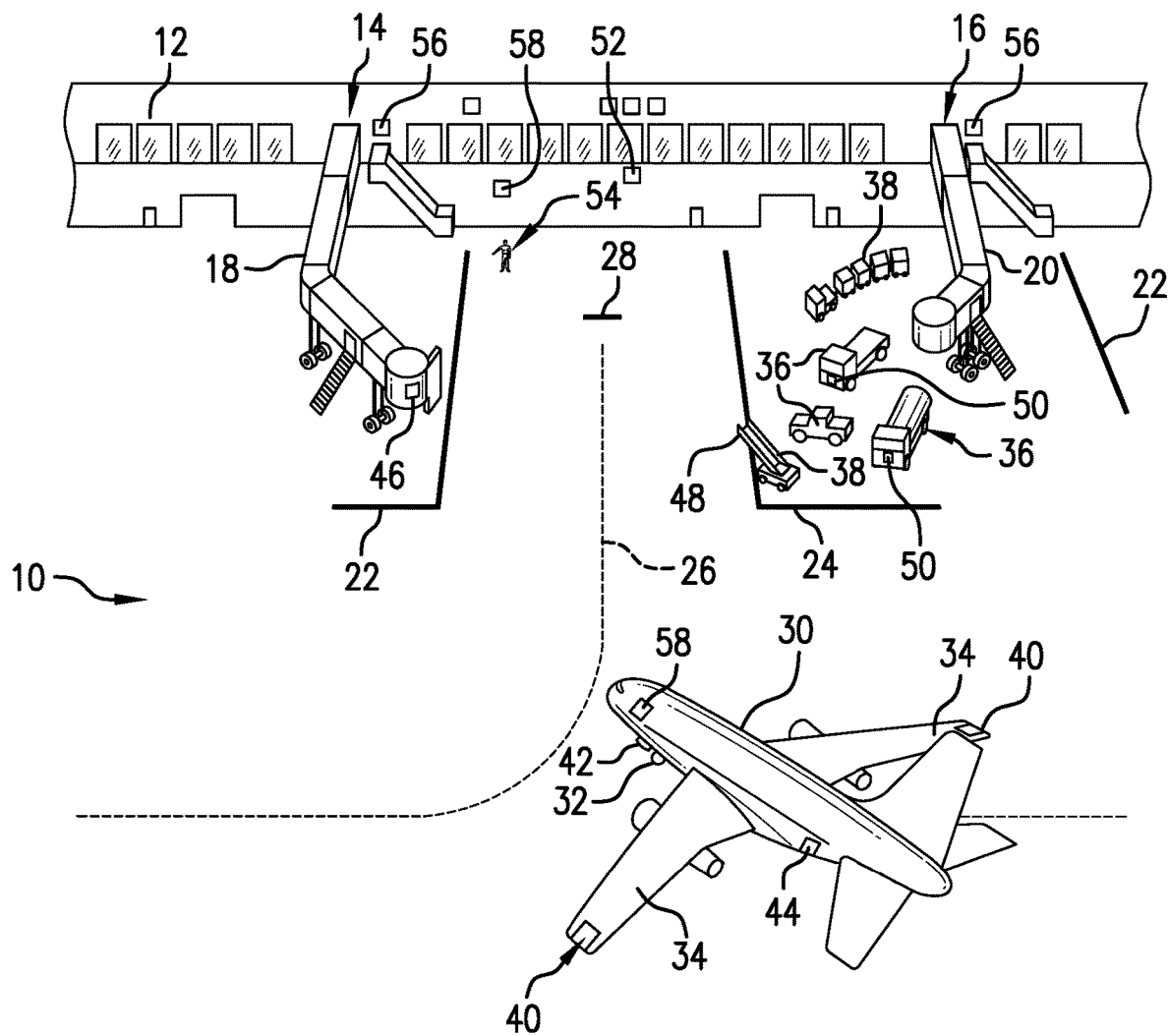
FIG. 1 is a diagrammatic view of an airport apron or ramp area equipped with the monitoring system of the present invention showing locations of gates with passenger loading bridges, ground service vehicles, and personnel and also showing a single aircraft equipped with an electric taxi system powering the aircraft's movement and the present monitoring system as it is driven into the ramp area by the electric taxi system.

As noted above, the movement of aircraft into, out of, and within congested airport ramp areas while avoiding collisions and other adverse ground incidents is critical to maintaining the safety of all persons and vehicles in this portion of an airport. Monitoring the ground travel environment of aircraft that are moving in these congested areas will help to avoid collisions between moving aircraft and other moving or stationary vehicles and personnel, significantly improving the safety and efficiency of airport ramp ground operations. Optimally, a monitoring system improves situational awareness as pilots and flight crew are driving an aircraft during ramp ground operations by providing a clear perspective view of the spatial environment around the moving aircraft from the cockpit and other locations inside the aircraft. Ideally, views from ramp and ground control perspectives are also provided. The data collected and analyzed by the present monitoring system may enable automatic or, when necessary manual, control of the aircraft's electric taxi drive system more quickly than has been possible to alter the aircraft's ground travel and avoid a potential collision incident. Data collected and analyzed may also be employed to automatically or manually control movement of ground service vehicles and equipment. The monitoring of overall ramp operations, including movements by electric taxi-driven aircraft, ground service vehicles and equipment, and aircraft that are not equipped with electric taxi systems enables the collection of data that may be processed, analyzed, and categorized by artificial intelligence-based processing systems to improve safety and efficiency of ramp operations.

The term "artificial intelligence" is used herein to refer to and encompass systems of data processing and analysis that are conducted by computers capable of harvesting large amounts of possible input data, including images and other information from monitoring and sensing devices, that may be processed, analyzed, and categorized based on a set of rules and then may be communicated so that appropriate action may be taken, whether automatically by a system receiving the processed and analyzed data or, when necessary, manually by a human.

The terms "ramp" and "ramp area" will be used herein to refer to the area at an airport that is intended to accommodate aircraft for the loading and unloading of passengers, mail, cargo, fueling, parking, or maintenance and is synonymous with the term "apron," which is also used to identify this area at an airport.

"Electric taxi drive systems" refer to pilot-controllable systems used to drive aircraft independently of operation of aircraft engines and external tow vehicles that include landing gear wheel-mounted electric drive motors activatable to drive the aircraft during ground travel in response to pilot control. An example of an electric taxi system developed by Applicant to drive an aircraft independently during ground travel without reliance on operation of the aircraft's engines or attachment to external tow vehicles is described in commonly owned U.S. Patent Application Publication No. US 2016/0167803, the disclosure of which is fully incorporated herein in its entirety. Other drive systems using drive motors that are not electric, including, for example, hydraulic or pneumatic drive motors may also drive aircraft in connection with the intelligent monitoring system and method of the present invention and are contemplated to be included within the terms "electric taxi drive systems."

Referring to the drawings, FIG. 1 is a diagrammatic view of an airport ramp area 10 with a terminal building 12. Two gates 14 and 16 and their respective passenger loading bridges 18 and 20 are shown. Only a portion of the terminal building 12 adjacent to the ramp area 10 is shown. Depending on the size of the airport, there are likely to be a number of additional gates, and the terminal building may also have a different configuration. The ground surface of the ramp 10 may be marked with lines that indicate safety margins for ground equipment and passenger loading bridges. In FIG. 1, lines 22 indicate what are termed "foul lines" for the passenger loading bridges 18 and 20, and line 24 indicates a foul line for ground service equipment near gate 16. A similar foul line (not shown) would be marked near gate 14. A taxi line 26 guides the aircraft 30 to a stop location 28. According to one estimate, over 80% of ground incidents in ramp areas occur within the gate stop area and the gate entry and exit locations. Aircraft 30 is shown entering the gate entry location for gate 14. While marking foul lines, taxi lines, and stop locations on the ramp ground surface is helpful, this has not prevented the occurrence of collisions and other ground incidents within ramp areas. A monitoring system and method that surveys the ramp area during ramp operations from a number of perspectives and communicates warnings to aircraft crew, ground crew, and others with responsibility for ramp safety, for example ramp operations supervisors and air traffic control, allows action to be taken to avoid a collision or other incident is needed.

Whether or not the aircraft are driven by electric taxi drive systems, a monitoring system and method should be able to monitor or survey a maximum portion of an aircraft's external ground environment where potential obstructions are likely to be found and to generate and communicate information about ground environment conditions, including the presence or absence of obstructions, that may impact the safety of the aircraft. The pilot may then control the electric taxi system to move the aircraft as required in response to the ground environment conditions. A single kind of monitoring or sensor device or a range of different sensors, sensor devices, monitoring devices, and the like that are capable of obtaining and communicating information relating to an aircraft's surroundings during entry into and exit from the ramp area in any visibility or environmental conditions may be provided. Intelligent or smart monitoring and sensing devices may be used. A single kind of monitoring or sensor device may be used on an electric taxi system-driven aircraft, for example, and a range of different monitoring and sensor devices may be used on ground service vehicles and equipment, passenger loading bridges, gates and terminal buildings, and even on ground personnel. During pushback when the aircraft is exiting the ramp area, sensor systems similar to those currently available for use in automobiles to enable them to back up safely may be adapted or combined with other sensors, sensor devices, and monitors to provide information and appropriate warnings about the aircraft's environment during pushback to all those with responsibility for ramp safety.

For maximum effectiveness, monitoring an aircraft's ground environment at different heights from the ramp ground surface may ensure that a variety of different kinds of potential obstructions will be detected. Although different kinds and various numbers of monitoring and sensor devices may be employed to obtain a maximum amount of information, it is contemplated that the monitoring system of the present invention may process information from a single type of monitoring device positioned on an aircraft to generate a three-dimensional image or another desired output. The monitoring and sensor devices used with the present monitoring system should have the capability to scan or "sweep" an aircraft's exterior at all times while it is moving into, within, and out of the ramp area. Monitoring may be continuous or it may be intermittent, depending in part on the most effective operation of a particular type of monitoring or sensor device.

A range of different kinds of monitoring devices and sensor devices that are capable of scanning or sweeping an airport ramp area and the vehicles, equipment, and structures that move within the ramp or are unmovable or permanently located in the ramp area may be employed in the present system and method. Monitoring devices may operate continuously, intermittently, or in an optimum combination of continuous and intermittent operation. In addition, it is contemplated that any of the monitoring devices and sensor devices used as described in the present monitoring system and method may be smart devices or intelligent devices. A constant stream of data may optimally be provided by these monitoring and sensing devices during ramp operations.

The constant stream of data may be provided by a camera that may operate continuously, while an ultrasound, radar or LiDAR system may be adapted to operate intermittently. This capability will enable the pilot, and potentially ground or ramp control personnel, to control operation of the electric taxi drive system to change aircraft travel direction or stop the aircraft at any time when an obstruction is detected by the monitoring system. Cameras may be located in positions on the exterior of an aircraft where a complete view of the ground level environment at different heights above the ground all around the aircraft may be obtained. It is preferred to mount at least one camera in the vicinity of the nose landing gear to communicate with the monitoring system and to ensure that the pilot has a clear view of the aircraft's nose landing gear. A wide angle camera, for example, may be used to provide an optimal expanded view of the area in front of and along the sides of the nose landing gear as the aircraft is driven in forward and in reverse with the electric taxi drive system. An expansive view of this area may also assist the pilot to stay on the taxi line 26 in the event that the nose wheel must be steered at a sharp angle.

Additional sensors, sensor devices, monitoring devices, and the like, preferably digital, intelligent, or smart devices, that are designed to provide information about objects in or near an aircraft's ground travel path into, within, and out of the ramp area are also contemplated for use in a monitoring system with the present monitoring method. In addition to cameras, ultrasound, radar, and LiDAR mentioned above, such sensors may include, for example without limitation, sonar, LADAR, and global positioning systems (GPS), similar to those currently used for enhanced environmental monitoring in automobiles, but specifically adapted for aircraft use. Proximity sensors, which may be attached to locations at the extremities of an aircraft, for example the wing tips, tail, nose, as well as to other aircraft exterior locations may also be used to monitor potential obstructions. The use of a range of different types of sensors, sensor devices, and monitoring devices, rather than relying on a single type of sensor, sensor device, or monitoring device, ensures that a maximum portion of an aircraft's exterior environment will be monitored in all visibility and weather conditions. When the effectiveness of one type of sensor or sensor device is limited as a result of weather or environmental conditions, other sensors or sensor devices are available to monitor the aircraft's exterior and communicate the presence or absence of obstructions in the aircraft's travel path to the cockpit. The foregoing sensors, sensor devices, and monitoring devices may also be used on ground service vehicles, ground service equipment, on ramp structures such as passenger loading bridges, and even on ramp ground personnel.

The aircraft 30 in FIG. 1 is equipped with a pilot-controllable electric taxi drive system that powers aircraft ground movement without operating engines and tow vehicles. A preferred electric taxi drive system may include a pair of electric drive motors mounted completely within the wheel volume in each nose landing gear wheel 32 or, alternatively, within one or more of the main landing gear wheels on aircraft 30; the main landing gear wheels on aircraft 30 are not visible in FIG. 1. The electric taxi drive system is controlled by a pilot or the crew of the aircraft from the cockpit to drive an arriving aircraft into the ramp area 10, maneuver the aircraft within the ramp area into a parking location, such as that designated by the stop location 28, and then drive a departing aircraft out of the ramp area.

In FIG. 1, some possible locations for monitor devices and sensor devices are shown schematically and not to scale. The electric taxi system-driven aircraft 30 may, for example, be equipped with sensor or monitoring devices 40 on or near the tips of the wings 34. A camera 42 may be mounted to provide a view of the nose landing gear 32. An additional monitoring device 44, for example a LiDAR, LADAR, radar, or like device, may be mounted on the exterior of the aircraft 30. These locations are exemplary, and it is anticipated that these and other locations on aircraft exterior surfaces will support one or more similar monitoring and sensor devices. As discussed herein, the use of a range of different devices, for example cameras, proximity and other sensors, and LiDAR, mounted in multiple locations is preferred to provide a maximal amount of information about the aircraft ground environment. Sensor and monitoring devices, as noted, may also be mounted on ground service equipment and vehicles and structures in the ramp area. For example, a monitoring device 46 is shown mounted on a passenger loading bridge 18. A sensor device 48 is shown mounted on a piece of ground service equipment 38, and sensor devices 50 are shown mounted on ground service vehicles 36. A camera 52 is shown mounted on the terminal building 12. Other kinds of monitoring and sensor devices may be mounted in these and other locations in the ramp area selected to ensure optimal monitoring of the movement of all of the aircraft, vehicles, and equipment during ramp operations within the scope of the present invention.

Sensors, sensor devices and monitoring devices useful with the present monitoring method may be removably or permanently attached to or embedded in exterior aircraft and ground vehicle and equipment structures at locations, such as those shown in FIG. 1, that are selected to maximize the extent of environmental information obtained during electric taxi system-driven aircraft ground travel into, within, and out of ramp areas. These various sensor and monitoring and sensor devices should preferably be capable of checking for obstructions at a range of heights above a ground surface relative to an aircraft for maximum opportunity to detect structures and/or objects that might interfere with or obstruct aircraft movement. The foregoing sensors or monitoring and sensor devices may be adapted to continuously monitor an aircraft's exterior environment during aircraft forward movement, as well as prior to pushback and during pushback as the aircraft moves in reverse and turns. Alternatively, these sensors and monitoring and sensor devices may be adapted to intermittently monitor the aircraft exterior environment. Radar and LiDAR or LADAR systems, for example, may be programmed to release, respectively, a burst of microwave or laser energy at random or at selected intervals to detect potential obstructions in an aircraft's ground travel path.

Ramp ground personnel, such as the ramp worker 54 shown in FIG. 1, may additionally be provided with smart devices that use artificial intelligence to assist them with a range of ramp operations. Such smart devices may include the head-mounted devices that are designed to receive information that could be generated by processing and analyzing data relating to relative locations of aircraft and other ramp vehicles and equipment from the monitoring and sensor devices described above. Ramp ground personnel may be in a better position to receive and then communicate warnings of potential ground incidents and collisions to aircraft pilots and ground vehicle operators.

Data from the different kinds and locations of sensors and monitoring and sensor devices, which may be in the form of images or other data, may be sent to an artificial intelligence-based processing system, preferably one capable of intermediate and high level image understanding. Such a system may have the capability to interpolate a three-dimensional view from a single two-dimensional image, in much the same way a human is capable of generating such an image. The present monitoring system may also employ artificial intelligence to analyze data relating to ramp movements of aircraft and other vehicles and equipment and then identify inefficiencies in the turnaround process, which may be communicated to ramp operations supervisors and personnel, air traffic control, pilots, and others involved with aircraft turnaround.

Information relating to the aircraft's ground environment from sensors and/or sensor and monitoring devices may also be communicated to the aircraft's cockpit, to ground control, and to other locations in any one of a number of ways. Visual and/or audio indicators, such as, for example without limitation, selectively colored flashing and/or non-flashing lights and/or selected sounds or tones may be used. A video display may further be employed to show, in real time, the exterior of the aircraft and/or a map of the aircraft's surroundings that may include relative locations and distances of other aircraft and ground vehicles that might pose obstructions or collision threats as the aircraft exterior is "swept" by selected sensors and/or monitoring devices. Other video displays and/or acoustic indicators are known in the art may be used and are contemplated to be within the scope of the present monitoring system and method.

The ground movement and travel path of aircraft driven into, within, and out of an airport ramp area is currently monitored and directed by a combination of information available to the pilot and flight crew, ranging from what they are able to view from cockpit windows, from any sensors attached to the aircraft exterior in communication with the cockpit, from audio or visual communications by ground personnel, and from ground control. As noted above, there are portions of the aircraft exterior and the spatial environment around the aircraft that are not visible from the cockpit, and the pilot or crew does not have a complete line of sight from the aircraft nose to the tailskid during ground travel. Depending on where ground personnel are located, they also may not have a view of the entire aircraft exterior. Sensors, including proximity sensors, and video cameras mounted on an aircraft's wing tips, fuselage, and elsewhere, as shown in FIG. 1, may help to communicate information to the cockpit from these locations. When adverse weather or environmental conditions limit visibility around an aircraft moving into the ramp area, the usefulness of such sensors may also be very limited, and the presence of other aircraft, vehicles, and persons in the ramp area may not be detected or communicated to the cockpit. Providing a number of different kinds of sensors on an aircraft and/or in the ramp area and the use of an artificial intelligence-based system for processing and communicating information relating to the ramp environment from these different kinds of sensors presents more accurate information than has heretofore been available more quickly than has been possible to cockpit crews and ground crews. As a result, collisions and ground incidents are more likely to be prevented.

The pilot and crew driving the aircraft 30 on the ground with the electric taxi system, or in any other manner, have a relatively limited view and cannot see all of the aircraft's exterior or the ramp area environment surrounding the aircraft from the cockpit. Consequently, as the aircraft 30 is driven into, within, and out of the ramp area, the presence of other aircraft, ground vehicles, equipment, and personnel near all portions of the aircraft's exterior that are not visible from the cockpit poses collision and other hazard risks. The video cameras and proximity sensors currently used to help mitigate collision risks do not function equally effectively in all weather and environmental conditions. Additionally, video cameras are presently capable of monitoring only a relatively limited ground space around an aircraft and cannot provide a line of sight from the aircraft nose to the tailskid to those in the aircraft cockpit. The use of one or more LiDAR sensing or monitoring devices, such as at 44, may provide a panoramic view of selected portions of the aircraft's exterior surfaces, including the fuselage and wings, and the surrounding ramp ground environment from a defined point of view of a pilot or other person inside the aircraft or from a defined point of view from a person outside the aircraft. Further, images within this panoramic view may be generated under any weather and light conditions that may be encountered at an airport ramp. The present monitoring system may also employ additional LiDAR sensing and monitoring devices to provide multiple fields or points of view.

It is contemplated that the present monitoring system may be programmed to recognize and signal ramp safety and hazard zones within the boundaries of the fields of view to the pilot in the cockpit driving the aircraft, as well as to others outside the aircraft, such as ground control personnel and air traffic control personnel, to whom this information would be helpful. Safety zones and hazard zones may be defined by, for example, aircraft specifications and/or airlines' and airport's standard operating procedures.

The majority of potential collision or other hazard risks near an aircraft driven into, within, and out of a ramp area are likely to be within a volume or space surrounding the aircraft from the ground surface of the ramp 10 to just above the wings 34 of aircraft 30. While a number of different kinds of monitoring and sensor devices may preferably be mounted on aircraft structures in exterior locations that will afford the desired panoramic point of view during ground travel, including those shown in FIG. 1 and elsewhere, a single kind of monitoring and sensor device, in combination with an artificial intelligence-based processing system, may also provide similar information.

There are a number of potential locations for monitoring and sensing devices on the exterior of an aircraft in addition to those shown in FIG. 1, including in or on the ground-facing portion of the fuselage and structures attached to the ground-facing portion of the fuselage, and on nose and/or main landing gear structures.

It is contemplated that one or more scanning types of monitoring devices may be positioned to obtain a defined point of view from any point within or without the aircraft, generate panoramic images of the point of view, and transmit data corresponding to the images to an artificial intelligence-based processing system. The system may be designed so that a pilot in the cockpit may select a view of the aircraft lower fuselage and then a view of an area a desired distance aft of the aircraft from any distance above the aircraft to be able to see this entire area on a single screen. The pilot or crew may also be able to define and select a point of view from the perspective of ground personnel, for example wing walkers and tail walkers, or from the airport terminal, the air traffic control tower, or from any other perspective. Monitoring devices may be positioned to view relative positions and locations of ground service vehicles and equipment and the aircraft during ground travel within the ramp area from these perspectives.

As noted above and discussed in connection with FIG. 1, the present monitoring system also contemplates equipping ground service vehicles 36 and ground support vehicles 38 with a range of different kinds of monitoring devices. These devices may be integrated into new or available digital systems that monitor and ground control ramp movement of aircraft and other vehicles. The ramp digital system and the present monitoring system may also be integrated into digital systems used by air traffic control in airport towers to monitor and control ground movement. Monitoring and sensing devices 56 may also be provided at or on the gates 14 and 16, on passenger loading bridges, and on the terminal building 12 to provide a different, expanded view of the ramp area 10 than that provided by the monitoring and sensing devices mounted on the aircraft 30 and the ground vehicles 36 and ground service equipment 38. The data from the monitoring and sensing devices in all of these locations is fed to the artificial intelligence-based processing system described above, which then communicates information relating to ramp movements and potential ground incidents, as well as any other helpful information, to aircraft cockpit crews, ground crews, drivers of ground service vehicles, operators of ground service equipment, ramp operations supervisors, air traffic control, and others who should receive this information.

Any controls required for the monitoring and sensor devices and processing hardware may be connected to cockpit controls for the electric taxi drive system (not shown), providing pilot control of the monitoring system with the operation of the electric taxi drive system. These controls may also be stand-alone controls to be operated at times when the electric taxi drive system is not in operation. It is also contemplated that the aircraft and ground service vehicles and equipment equipped with the present monitoring system may be provided with a "kill" switch, a "dead man" switch, or like switch element (not shown) that may be operated to avoid an imminent collision. Such a switch may be automatically activated, for example by the artificial intelligence-based processor software. Manual operation of such a switch to stop aircraft ground travel with the electric taxi drive system by an aircraft pilot, ground service equipment operators, or air traffic controllers could also be provided.

It is contemplated that some or all of the data processed by the artificial intelligence-based processing system may be communicated to any remote or automated interested party external to the aircraft capable of accelerating or enhancing monitoring and improving safety of an aircraft and its ramp environment. The system may additionally provide the views or feed from devices on a single aircraft or on all aircraft in the ramp simultaneously or selectively to ground personnel, air traffic control, airline dispatchers, and others responsible for the safe conduct of ramp operations and prevention of collisions within ramp areas. In addition to its use to ensure ramp safety in real time, processed data from the artificial intelligence-based processing system relating to aircraft movements and other ramp activity may be stored for use at a later time.

It is contemplated that an artificial intelligence-based processing system 58 may be located on the aircraft 30, within a terminal building adjacent to a ramp area, as shown schematically in FIG. 1, or in another airport location (not shown).

Figure 2:
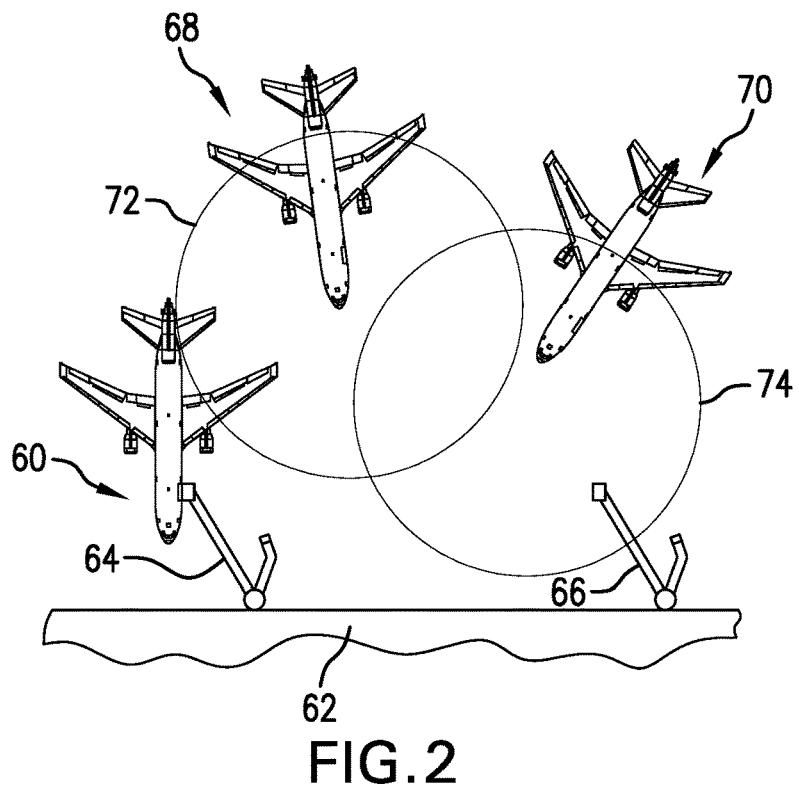
FIG. 2 is a diagrammatic view of aircraft equipped with the monitoring system of the present invention and driven in an airport ramp area with electric taxi drive systems showing areas that may be monitored in accordance with the present invention as the aircraft are driven into the ramp area.
Figure 3:
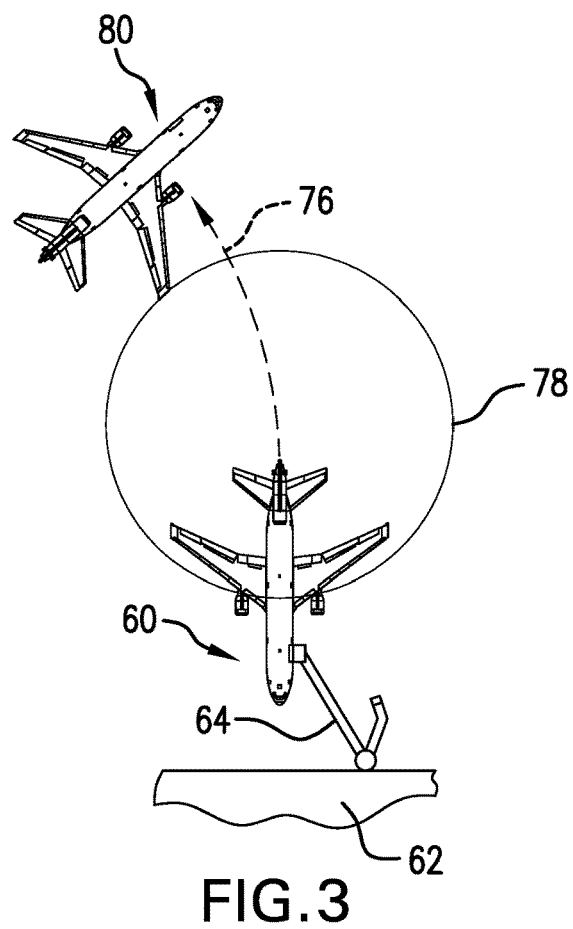
FIG. 3 is a diagrammatic view of aircraft equipped with the monitoring system of the present invention during pushback out of an airport ramp area parking location showing a selected area that may be monitored as an aircraft is driven in reverse with electric taxi drive system during pushback

FIGS. 2 and 3 illustrate, respectively, aircraft entering an airport ramp area and an aircraft pushing back from an airport ramp parking location to leave a ramp area. The fields of view or monitored areas provided in each situation by the present monitoring system that enable the aircraft to avoid potential collision hazards are also illustrated. The aircraft in FIGS. 2 and 3 are all equipped with electric taxi drive systems for independent ground travel. Ground service vehicles and ground service equipment, such as those shown in FIG. 1, would also be present in the ramp area, but have been omitted for clarity. FIG. 2 shows an aircraft 60 in a ramp area parking location connected to an airport terminal 62 by a passenger loading bridge 64. A passenger loading bridge 66 at the terminal 62 is available for connection to an arriving aircraft. Two aircraft 68 and 70 are being driven into the ramp area by aircraft electric taxi drive systems to park at the terminal 62. The aircraft 68 and the aircraft 70 are both equipped with one or more monitors and sensing devices that may include cameras and/or scanning devices as described above, preferably mounted on or near the aircraft nose and/or main landing gears and in other locations on the aircraft fuselage. The circles 72 and 74 indicate the respective areas monitored by the cameras and scanning devices, such as those identified at 42 and 44 in FIG. 1, mounted on each of the aircraft 68 and 70. Data from the monitored areas 72 and 74 is transmitted to an artificial intelligence-based processing system, such as the processing system identified at 58 in FIG. 1, for analysis and communication to the aircraft cockpits, ground control, and any of the other entities mentioned above with responsibility for ramp safety. Visual representations of these spaces may also be projected to display screens in the cockpits of aircraft 68 and 70.

The pilot of aircraft 68 will be able to view the locations of the port wing and tail fin of aircraft 60 relative to the starboard wing of aircraft 68 on a cockpit display screen (not shown). The pilot and crew will be able to change the direction of ground travel to avoid collision between the starboard wing of aircraft 68 and the port tail fin and the port wing of aircraft 60. The pilot of aircraft 70 will be able to see the location of the passenger loading bridge 66 and will be able to change the direction of ground travel to park in an optimum orientation at the passenger loading bridge 66. As the aircraft 68 changes its direction of ground travel to avoid contact with aircraft 60, the presence of aircraft 70 will be detected by the monitoring system, and the pilot can control ground travel with the electric taxi drive system to avoid collision with aircraft 70. As noted above, the ramp area around the aircraft 60, 68, and 70 will also include ground service vehicles, ground service equipment, and personnel, and their locations within areas 72 and 74 will be detected and shown by the present monitoring system and communicated to pilots and others by the artificial intelligence-based processing system. The pilots of aircraft 60, 68, and 70 will be able to change the direction of ground travel or stop ground travel of the aircraft as required to drive the aircraft safely within the ramp area, or this may be done automatically. As noted above, the system may also provide a signal to the pilots of aircraft 68 and 70 to indicate the entrance into and/or the presence of the aircraft in a hazard zone. Another signal may be transmitted to indicate the presence of the aircraft in a safety zone. Alternatively, a constant signal, such as a green light, may be provided when the aircraft is in a safety zone, and a different signal, for example a flashing red light or an audible tone, may indicate intrusion into a hazard zone with the potential for a collision involving the aircraft.

FIG. 3 shows aircraft 60 ready for pushback from the passenger loading bridge 64 at the terminal 62. The dashed line 76 indicates a ground travel path in the ramp area along which the aircraft 60 may be driven in reverse by the pilot controlling the electric taxi drive system before the aircraft 60 is then driven forward by the electric taxi drive system to a taxiway and takeoff runway. Aircraft 60 is also equipped with the present monitoring system. The circle 78 represents the field of view scanned by a scanning device in the monitoring system, which may be transmitted to a display screen in the cockpit of aircraft 60 where the pilot can see the scanned view or to the other personnel and/or locations described above. If the pilot continues to drive the aircraft 60 along the ground travel path 76, a collision with aircraft 80 could occur. The pilot will be able to change the ground travel path 76 from that shown or, if necessary, stop the aircraft and avoid a potential collision. FIGS. 2 and 3 represent only a very few examples of possible scenarios in which monitoring and sensing devices mounted to provide panoramic views of portions of aircraft and adjacent ramp areas not otherwise visible may transmit data for processing and analysis by an artificial intelligence processing system for communication to all those with responsibility for ramp safety so that collisions may be avoided.

The present invention further includes a method for improving airport ramp safety when ground collisions and incidents are prevented within an airport ramp area as aircraft, particularly aircraft driven by electric taxi drive systems, are moved into, within and out of the ramp area with the electric taxi drive systems. The safety of ramp operations for all aircraft, ground service vehicles, and ramp personnel may be improved with this method. Data relating to locations of moving and non-moving aircraft, ground service vehicles and equipment, passenger loading bridges, personnel, and anything else in a ramp area may be obtained using the present monitoring system, and this data may be processed and analyzed to communicate warnings of potential hazards and, if warranted, to automatically or manually control further movement of the aircraft or other movable vehicles to prevent a ground incident. The data may also be used to analyze and improve overall ramp operations.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability when it is desired to improve the safety of airport ramp operations and aircraft ground movement, particularly when aircraft are driven into, within, and out of airport ramp areas with electric taxi systems, and to increase the likelihood that ground incidents involving aircraft, ground service vehicles and equipment, passenger loading bridges, and other vehicles and structures in airport ramp areas will be avoided.

The invention claimed is:

1. An artificial intelligence-based airport terminal ramp area monitoring system that improves ramp operations safety in all visibility conditions for electric taxi drive system-driven during all real time monitored ground travel within the airport ramp area, comprising: a. an airport ramp area at an airport terminal with a plurality of passenger loading bridges attached to said terminal, aircraft, moving ground service vehicles and equipment, and nonmoving structures within said ramp area; b. said aircraft being equipped with landing gear wheel-mounted electric taxi drive systems operable by a pilot to drive said aircraft during all ground travel within said airport ramp area, with multiple different monitoring devices mounted at different heights above a ramp surface in exterior locations on said equipped aircraft operable to provide constant streams of real time data comprising views or images of and information about a monitored volume of exterior ramp space surrounding said equipped aircraft not visible to a pilot in a cockpit of said aircraft extending from a ramp surface to just above a wing of said equipped aircraft, and with at least one display located in at least a cockpit of said equipped aircraft; c, additional monitoring devices operable to provide real time views of and information about said ramp area surrounding said equipped aircraft mounted in exterior locations on at least said moving ground service vehicles and equipment; and d. an artificial intelligence-based processing system capable of intermediate and high level image understanding using artificial intelligence-based processor software in data transfer communication with said multiple monitoring devices mounted on said equipped aircraft, said additional monitoring devices mounted on at least said moving ground service vehicles and equipment, and with said at least one display to receive said constant streams of real time data with said real time views of and information, to process said constant streams of real time data using said artificial intelligence-based processor software, to generate real time views and images of and information about said equipped aircraft's monitored volume and said surrounding ramp area from said processed real time data, and to communicate said generated real time views, images, and information to said at least one display.

2. The system of claim 1, wherein said multiple different monitoring devices and said additional monitoring devices comprise cameras, scanning devices, and position sensing devices or intelligent or smart cameras, scanning devices, and position sensing devices.

3. The system of claim 2, wherein said multiple different monitoring devices and said additional plurality of monitoring devices comprise continuously operating monitoring devices, intermittently operating monitoring devices, or a combination of continuously operating and intermittently operating monitoring devices.

4. The system of claim 3, wherein said multiple different monitoring devices comprise scanning LiDAR devices mounted in said equipped aircraft exterior locations selected to provide said views of said monitored volume and a view of said equipped aircraft exterior adjacent to said ramp surface from a nose to a tailskid of said aircraft, cameras mounted on at least a nose landing gear of said equipped aircraft to provide additional views of said monitored volume, and position sensing devices mounted on wings of said equipped aircraft to provide real time position information to said artificial intelligence-based processor.

5. The system of claim 4, further comprising other monitoring devices operable to provide real time views of and information about said ramp area surrounding said equipped aircraft mounted in exterior locations on said passenger loading bridges, in exterior locations on said nonmoving structures, and in exterior locations on ground crew within said ramp area surrounding said electric taxi drive system-driven aircraft in data transfer communication with said artificial intelligence-based processor.

6. The system of claim 5, further comprising additional displays located in ramp control locations outside or remote from said electric taxi drive system-driven aircraft cockpit in data transfer communication with said artificial intelligence-based processor to receive said real time views and images and said information.

7. The system of claim 6, wherein said at least one cockpit display and said additional displays comprise a map of said airport ramp area with at least position and distance information between said electric taxi drive system-driven aircraft and other aircraft, ground service vehicles and equipment, and nonmoving objects identified as safety hazards.

8. The system of claim 1, further comprising safety and hazard indicators in the forms of selectively colored flashing and non-flashing lights and selected sounds and tones in said at least one cockpit display operative to receive safety and hazard information from said artificial intelligence processor-generated information.

9. An artificial intelligence-based airport terminal ramp monitoring method that monitors all real time ground travel of electric taxi drive system-driven aircraft within an airport ramp area and improves safety of ramp operations, comprising: a. equipping aircraft with landing gear wheel-mounted electric taxi drive systems to drive the equipped aircraft during all ground travel within an airport ramp area and mounting multiple different monitoring devices in multiple exterior locations at different heights above a ramp surface on the equipped aircraft selected to provide views or images of and information about a monitored volume of exterior ramp space extending from the ramp surface to just above a wing of the equipped aircraft not visible to a pilot in a cockpit of said aircraft and a ramp ground travel path of the equipped aircraft, operating the multiple different monitoring devices, and generating constant streams of real time data with the views or images and information as the equipped aircraft is driven with the electric taxi drive systems within the airport ramp area; b. mounting additional monitoring devices in exterior locations on moving ground service vehicles and equipment within the airport ramp area, mounting other monitoring devices on passenger loading bridges, nonmoving structures, and ground crew within the airport ramp area, operating the additional and the other monitoring devices and generating constant streams of real time data with the views or images of and information about the monitored volume, ramp area surrounding the equipped aircraft, and ramp area ground travel path as the equipped aircraft are driven with the electric taxi drive systems within the airport ramp area; c. driving the equipped aircraft with the electric taxi drive systems along the ramp ground travel path, obtaining the generated constant streams of real time data about the monitored volume, surrounding ramp area, and the ramp ground travel path from the multiple different monitoring devices, the additional monitoring devices, and the other monitoring devices, and transmitting the generated constant streams of real time data with the views or images and information to an artificial intelligence-based processing system capable of intermediate and high level image understanding using artificial intelligence-based processor software; d. processing the transmitted constant streams of real time data by the artificial intelligence-based processor using the artificial intelligence-based processor software, producing real time views and images of and information about the equipped aircraft monitored volume, the ramp ground travel path, and the surrounding ramp area from the processed real time data, and communicating the produced real time views and images and information to at least a cockpit display in the equipped aircraft; e. identifying safety or collision hazards from the processed real time data and communicating an identified safety or collision hazard as a visual or an audio warning signal to the cockpit display and to additional displays located in ramp control locations outside or remote from the equipped aircraft cockpit; and f. altering or stopping ground movement of the electric taxi system-driven aircraft as required to avoid any identified safety or collision hazard.

10. The method of claim 9, further comprising producing three- dimensional images of the ramp area and a nose to said tailskid view of the electric taxi drive system-driven aircraft in the monitored volume by the artificial intelligence-based processing system from the transmitted real time data and transmitting the three-dimensional images to the cockpit display.

11. The method of claim 9, further comprising defining hazard zones and defining safety zones within the ramp area, programming the artificial intelligence-based processing system to recognize the defined hazard and safety zones, providing a signal element in the cockpit display in communication with the artificial intelligence-based processing system to receive the visual or audio warning signals, and automatically communicating the identified safety or collision hazard to the signal element as a visual or audio signal to the pilot when the processed real time data indicates that the aircraft is being driven with the electric taxi drive system from a safety zone into a hazard zone.

12. The method of claim 11, further comprising providing a manually or automatically activatable kill switch on the electric taxi drive system-driven aircraft or on the moving ground service vehicles and equipment, manually or automatically activating the kill switch to stop electric taxi drive system-driven ground travel of the aircraft or movement of the moving ground service vehicles and equipment in response to processed data from the artificial intelligence-based processing system, and causing the aircraft or the ground service vehicles and equipment to stop and avoid the identified safety or collision hazard.

13. The method of claim 9, wherein the multiple different monitoring devices comprise scanning LiDAR devices operable to produce panoramic views of the monitored volume, the ramp ground travel path, and the surrounding ramp area mounted in the multiple exterior locations on the equipped aircraft, generating a constant stream of real time data with the panoramic views of the monitored volume, the ramp ground travel path, and the surrounding ramp area, transmitting the constant stream of real time data with the panoramic views from the scanning LiDAR devices to the artificial intelligence-based processor, processing the constant streams of real time data produced by the multiple scanning LiDAR devices with the artificial intelligence-based processing system using the artificial intelligence-based processor software, producing real time panoramic images of at least the monitored volume, the ramp ground travel path, and the surrounding ramp area, and communicating the real time panoramic images and signals of identified safety or collision hazards in the equipped aircraft's monitored volume, surrounding ramp area, and ramp ground travel path in real time to the display.

14. The method of claim 13, wherein the multiple different monitoring devices comprise intelligent cameras or cameras mounted with the scanning LiDAR devices in the multiple exterior locations on the electric taxi drive system-driven aircraft, generating a constant stream of real time data with views of at least the monitored volume and the surrounding ramp area from the intelligent cameras or cameras and the scanning LiDAR devices, transmitting the generated constant stream of real time data to the artificial intelligence-based processor from the intelligent cameras or cameras and the scanning LiDAR devices, processing the generated constant stream of real time data with the artificial intelligence-based processor software, producing the real time views and images of the monitored volume and surrounding ramp area, and communicating the real time images and the warning signals of any identified safety or collision hazards in the equipped aircraft's ramp ground travel path in real time to the display.

15. The method of claim 9, further comprising processing the transmitted constant streams of real time data with the artificial intelligence-based processor software, producing the real time views and images and information about the equipped aircraft's monitored volume, ramp ground travel path, and the exterior ramp area, and storing the processed real time data with the real time views and images and information for further analysis or use if the processed real time data does not identify a safety or collision hazard.

* * * * *